(12) United States Patent
Iida et al.

(10) Patent No.: US 7,481,455 B2
(45) Date of Patent: Jan. 27, 2009

(54) AIRBAG SYSTEM FOR STEERING WHEEL

(75) Inventors: Hitoshi Iida, Aichi-ken (JP); Osamu Hirose, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 617 days.

(21) Appl. No.: 11/288,434

(22) Filed: Nov. 29, 2005

(65) Prior Publication Data

US 2006/0113776 A1   Jun. 1, 2006

(30) Foreign Application Priority Data

Nov. 30, 2004   (JP)   ............................. 2004-346789

(51) Int. Cl.
*B60R 21/16* (2006.01)
(52) U.S. Cl. .................... 280/743.1; 280/731
(58) Field of Classification Search ................. 280/731, 280/743.1, 728.2, 728.1, 730.1
See application file for complete search history.

(56) References Cited

U.S. PATENT DOCUMENTS

| | | | | |
|---|---|---|---|---|
| 4,004,828 A | * | 1/1977 | Sogabe et al. ............. | 280/743.1 |
| 5,280,952 A | * | 1/1994 | Hirabayashi et al. ........ | 280/739 |
| 5,364,126 A | * | 11/1994 | Kuretake et al. ........... | 280/730.1 |
| 5,529,339 A | * | 6/1996 | Niederman ............... | 280/743.1 |
| 5,547,218 A | * | 8/1996 | Kuretake et al. ........... | 280/743.1 |
| 6,443,482 B2 | * | 9/2002 | Yamamoto et al. ......... | 280/728.1 |
| 6,471,238 B2 | * | 10/2002 | Ishikawa et al. ........... | 280/728.3 |
| 6,918,868 B2 | * | 7/2005 | Vitet ........................... | 493/457 |
| 7,066,490 B2 | * | 6/2006 | Yamamoto et al. ......... | 280/743.2 |
| 2003/0222434 A1 | * | 12/2003 | Okada et al. .............. | 280/728.1 |
| 2005/0023809 A1 | * | 2/2005 | Yamamoto et al. .......... | 280/731 |
| 2005/0206141 A1 | * | 9/2005 | Ishikawa et al. ............ | 280/731 |
| 2006/0055156 A1 | * | 3/2006 | Okada et al. ................ | 280/731 |
| 2006/0055157 A1 | * | 3/2006 | Ishiguro et al. ............. | 280/731 |

FOREIGN PATENT DOCUMENTS

| JP | A-6-144136 | 5/1994 |
|---|---|---|
| JP | A-7-89402 | 4/1995 |

* cited by examiner

*Primary Examiner*—Ruth Ilan
*Assistant Examiner*—Drew J. Brown
(74) *Attorney, Agent, or Firm*—Posz Law Group, PLC

(57) ABSTRACT

In an airbag system for a steering wheel according to the invention, an airbag is folded through a first step and a second step after the airbag is unfolded flatly with a driver side wall and a vehicle body side wall superposed each other. Before the first step, the airbag is folded through a preliminarily-folding step to fold back a front edge side region to the vehicle body side wall along a folded line in a transverse direction. In the preliminarily-folded airbag, the folded front edge side is arranged within a range of 20% of the inner diameter of the ring part in each of opposite directions in the front-rear direction from a reference point on the inner peripheral edge of the front part of the ring part.

6 Claims, 13 Drawing Sheets

AIRBAG SYSTEM FOR STEERING WHEEL

The present application claims priority from Japanese Patent Application No. 2004-346789 of Iida et al., filed on Nov. 30, 2004, the disclosure of which is hereby incorporated into the present application by reference.

BACKGROUND OF THE INVENTION

1. Field of the Invention

The present invention relates to an airbag system for a steering wheel having an airbag that is folded and housed in a boss part of a steering wheel, which airbag can be unfolded and expand allowing the expansion gas to flow therein.

2. Description of Related Art

Conventionally, the airbag system for a steering wheel has the configurations disclosed in JP-A-6-144136 and JP-A-7-89402. In these airbag systems, an airbag is folded through first and second steps, then the folded airbag is housed. In the first step, superposing an approximate circular vehicle body side wall and a circular driver side wall and unfolding them flatly, then, the regions at the opposite edges in a transverse direction are folded along folded lines in an approximate longitudinal direction so as to bring these regions close to a gas inlet side that is arranged near the center of the vehicle body side wall. In the second step, the regions at the opposite edges in the longitudinal direction of the airbag folded in the first step are further folded along folded lines in the approximate transverse direction so as to bring these regions close to the gas inlet side.

However, in the conventional airbag system for the steering wheel, there is room for improvement in the reduction of the suppress strength of the airbag to a driver when the driver is near the steering wheel upon unfolding and expansion of the airbag.

SUMMARY OF THE INVENTION

The object of the present invention is to provide an airbag system for a steering wheel capable of unfolding and expanding an airbag with a pressing strength to the driver reduced when the driver is near the steering wheel.

The object of the invention can be achieved by an airbag system for a steering wheel.

The airbag system for a steering wheel is mounted on a steering wheel, wherein the steering wheel comprises: a ring part, which is formed in an approximate annular shape and is held upon operation of the steering wheel; a boss part, which is arranged on a center of the steering wheel and is coupled to a steering shaft; and a spoke part, which is arranged so as to connect the ring part with the boss part, the spoke part is provided so as to be able to secure a space for viewing a meter formed at the inner circumferential side of the ring part; the airbag system for the steering wheel comprises an airbag that is folded and housed in the boss part, the airbag can be unfolded and expand allowing the expansion gas to flow therein so as to be able to protect a driver and cover the upper side of the steering wheel; and the airbag is configured in such a manner that a peripheral edge of an approximate circular vehicle body side wall, which is arranged at the side of the steering wheel upon completion of expansion and has a gas inlet for allowing the expansion gas to flow in the vicinity of the center thereof, and a peripheral edge of a driver side wall, which is arranged at the driver's side upon completion of expansion and of which outer shape is approximately the same as that of the vehicle body side wall are coupled each other; wherein the airbag is folded and housed through at least two steps, namely, a first step and a second step after the airbag is unfolded flatly with the driver side wall and the vehicle body side wall superposed each other; in the first step, in order to reduce a width in a transverse direction of the airbag, the regions at the opposite edges in the transverse direction are folded along folded lines in the approximate longitudinal direction, respectively, so that the transverse edges are brought close to the gas inlet side; and in the second step, in order to reduce a width in the longitudinal direction of the airbag that is folded in the first step, the regions at the opposite edges in the longitudinal direction are folded along folded lines in the approximate transverse direction, respectively, so that the longitudinal edges are brought close to the gas inlet side; wherein the airbag is folded through a preliminarily-folding step that a front edge side region in the airbag flatly unfolded with the vehicle body side wall superposed on the driver side wall is folded back to the vehicle body side wall along a folded line in the transverse direction; the airbag after performing the preliminarily-folding step is configured so as to arrange the folded front edge side in such a manner that the folded front edge side is arranged in the vicinity of the inner peripheral edge at the front side of the ring part of the steering wheel in a plan view with the peripheral edge of the gas inlet attached at the side of the steering wheel; the front edge of the preliminarily-folded airbag is located within a range of 20% of the inner diameter of the ring part in each of opposite directions in the front-rear direction from a reference point on the inner peripheral edge of the front part of the ring part.

According to the airbag system for the steering wheel of the invention, at the early stage of expansion of the airbag, the airbag is unfolded and expands while releasing the folding in the first and second steps. In this time, according to the airbag system for the steering wheel of the invention, the front edge side region of the airbag is prevented from expanding so as to project toward the driver at the early stage of expansion of the airbag because this front edge side region is preliminarily folded so as to fold back the front edge side toward the vehicle body side wall before the first step. In other words, according to the airbag system for the steering wheel of the invention, when the driver is near the steering wheel bringing his or her head close to the front side of the ring part, upon unfolding and expansion of the airbag, the preliminarily-folded portion may project to the ring part as being pressed by the head of the driver. Then, according to the airbag system for the steering wheel of the invention, since this preliminarily-folded front edge side is further arranged in the vicinity of the inner peripheral edge of the ring part, the preliminarily-folded portion is pressed by the driver and enters the space for viewing a meter formed between the boss part and ring part to release the folding. In the case that the front edge of the preliminarily-folded airbag is located at the front side far from the inner peripheral edge of the ring part beyond the range of 20% of the inner diameter of the ring part in the front direction from the reference point on the front part of the ring part, it may be difficult to smoothly enter the preliminarily-folded portion into the space for viewing the meter. On the contrary, in the case that the front edge of the preliminarily-folded airbag is located at the rear side near the center of the ring part beyond the range of 20% of the inner diameter of the ring part in the rear direction from the reference point on the front part of the ring part, the area of the preliminarily-folded portion is too large and this results in that the airbag cannot be rapidly unfolded to the front side. Therefore, when the driver is seated at a normal position that is not near the steering wheel, it is feared that the rapid unfolding of the airbag is limited. However, according to the airbag system for the steering wheel of the invention, the front edge of the preliminarily-folded airbag is located within the range of 20% of the inner diameter size of the ring part in each of opposite directions in the front-rear direction from the reference point on the inner peripheral edge of the front part of the ring part. Accordingly, it is possible to unfold and expand the airbag so as to smoothly put the preliminarily folded portion into the space for viewing the meter. As a result, since the front edge side region unfolded in this space is pressed at its upper side by the ring part, the front edge side region of the airbag is prevented from expanding so as to project toward the driver's head near the steering wheel. In other words, according to the airbag system for the steering wheel of the invention, even if the driver is near the steering wheel, by pressing the upper surface side of the front edge side region of the airbag by the lower surface side of the ring part, the airbag is completely expanded. Then, it is possible to prevent the entire airbag from strongly pressing the driver to the rear side with the driver's jaw fastened, at the state that the front edge side region enters between the driver's neck and the driver's jaw.

Accordingly, in the airbag system for the steering wheel of the invention, the airbag can be unfolded and expand with the pressing strength to the driver reduced even when the driver is near the steering wheel.

In the meantime, in the case that the airbag system is activated with the driver not near the steering wheel, the front edge side region of the airbag enters the lower surface side of the ring part once at the early stage of expansion of the airbag. However, since the front edge side region of the airbag does not interfere with the head of the driver, it is caused that this front edge side region projects to the upper surface side of the ring part in accordance with the expansion of the other regions. Then, the airbag is completely expanded to cover the upper surface side of the steering wheel wholly. This makes it possible to protect the driver moving forward by the airbag completely expanded in an appropriate manner.

In addition, in the above-described airbag system for a steering wheel, it is preferable that, according to the second step, the airbag is folded in such a manner that at least a front side region located to the front side of the gas inlet is roll-folded from a front edge portion toward the vehicle body side wall.

According to the above-described airbag system for the steering wheel, at the early stage of expansion of the airbag, at first, when the airbag is unfolded by releasing the folding in the second step, the front side region located to the front side of the gas inlet that is roll-folded externally can easily enter the space for viewing the meter formed between the boss part and the ring part while releasing the folding. Therefore, it is possible to certainly put the preliminarily-folded region in the space for viewing the meter. In addition, at the early stage of expansion of the airbag, when the folding of the second step is released, it is possible to prevent the expanding front side region from projecting toward the head of the driver. As a result, it is possible to more prevent the expanded front side region from pressing the head of the driver who is near the steering wheel.

Further, in the above-described airbag system for a steering wheel, it is preferable that the airbag system is mounted on the steering wheel including at least two spoke parts so as to be elongated from the boss part right and left; and the space for viewing the meter in the steering wheel is formed opening into an approximate half circle and it has the largest opening area in plural spaces encircled by the boss part, the spoke part, and the ring part, respectively.

In such a steering wheel, since the space for viewing the meter can be secured widely, it is possible to put the preliminarily-folded front edge side of the airbag into this space for viewing the meter more smoothly when the airbag is unfolded and expands.

Moreover, in the above-described airbag system for a steering wheel, it is preferable that a folded front edge side in the airbag after the preliminarily-folding step is arranged at a rear side from an inner peripheral edge at a front side of the ring part because it is possible to certainly put this preliminarily-folded front edge side of the airbag in the space for viewing the meter with the driver being near the steering wheel.

Still further, in the above-described airbag system for a steering wheel, it is preferable that the airbag comprises a bag main body and a flow regulating cloth to control a flowing direction of the expansion gas into the bag main body; and the flow regulating cloth is configured so as to be able to flow the expansion gas along a longitudinal direction upon the early stage of the expansion of the airbag.

In the above-described airbag system for the steering wheel, at the early stage of expansion of the airbag, the expansion gas flows into the bag main body along the longitudinal direction. Then, the airbag can be unfolded along the longitudinal direction with rapidity. Therefore, the preliminarily-folded portion can be unfolded so as to enter the space for viewing the meter with rapidity.

Still further, in the above-described airbag system for the steering wheel, it is preferable that a vent hole to discharge the excess expansion gas flowing in the airbag is formed on the vehicle body side wall, and the vent hole is arranged at a position that is not filled with a preliminarily-folded portion to be formed by the preliminarily-folding step.

In the above-described airbag system for the steering wheel, at the early stage of expansion of the airbag with the driver being near the steering wheel, it is possible to prevent the sudden rise of the inner pressure of the airbag.

DESCRIPTION OF THE PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 11:
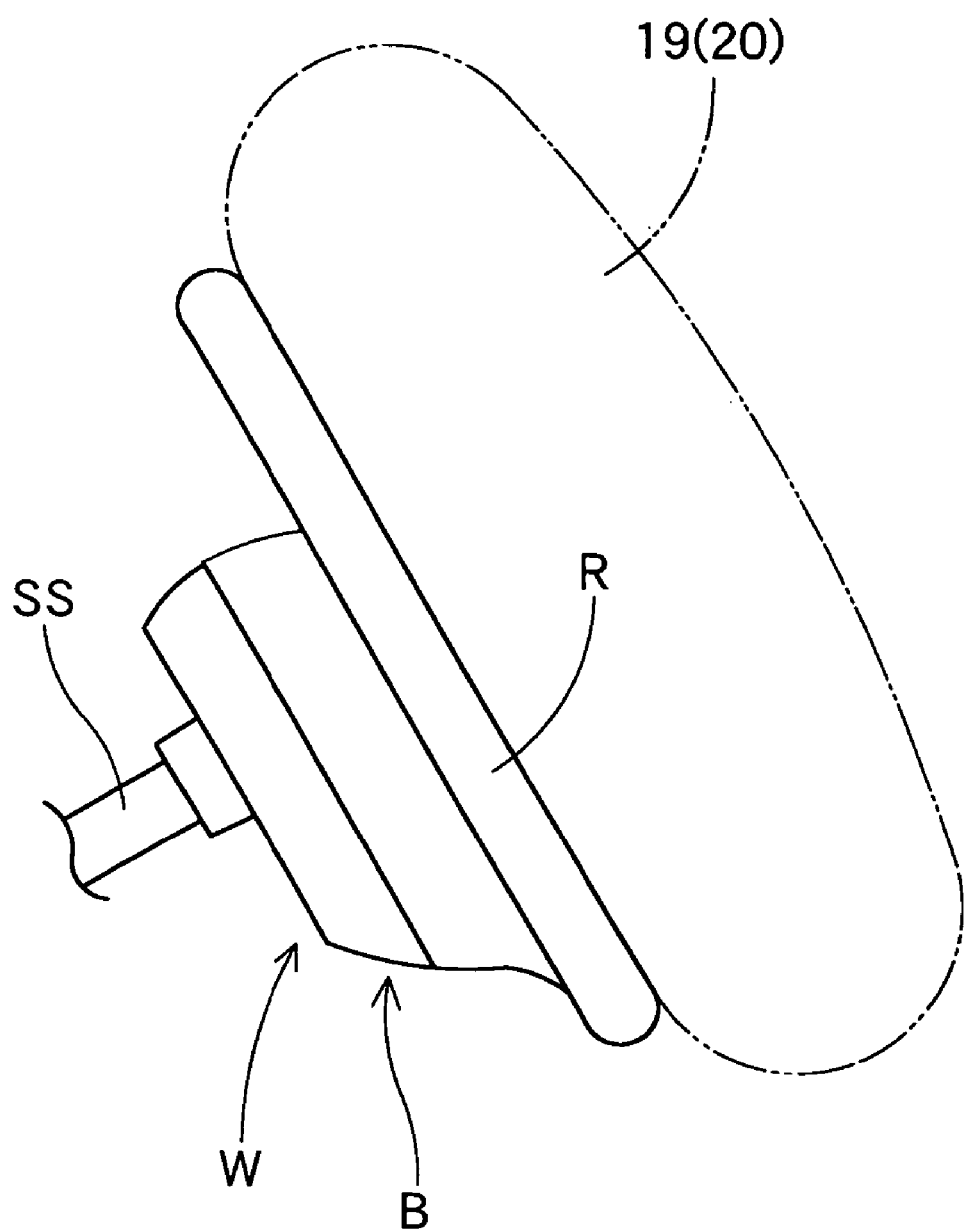
FIG. 11 is a schematic diagram showing the expansion completion state of the airbag in the airbag system of the embodiment seen from the side of the steering wheel.

Hereinafter, an embodiment of the invention will be described with reference to the drawings below. In the meantime, the longitudinal, vertical, and transverse directions in the embodiment are based on the case that a steering wheel W mounted in a vehicle is operated to go straight except for a special case. Specifically, an upper and lower direction along an axial direction of a steering shaft SS (refer to FIG. 11) to assemble a steering wheel W is defined as a vertical direction, a front and rear direction of the vehicle, which is perpendicular to the axis of the steering shaft SS, is defined as a longitudinal direction, and a right and left direction of the vehicle, which is perpendicular to the axis of the steering shaft SS, is defined as a transverse direction. These directions indicate the front and rear, the upper and lower, and the right and left directions, respectively.

Figure 1:
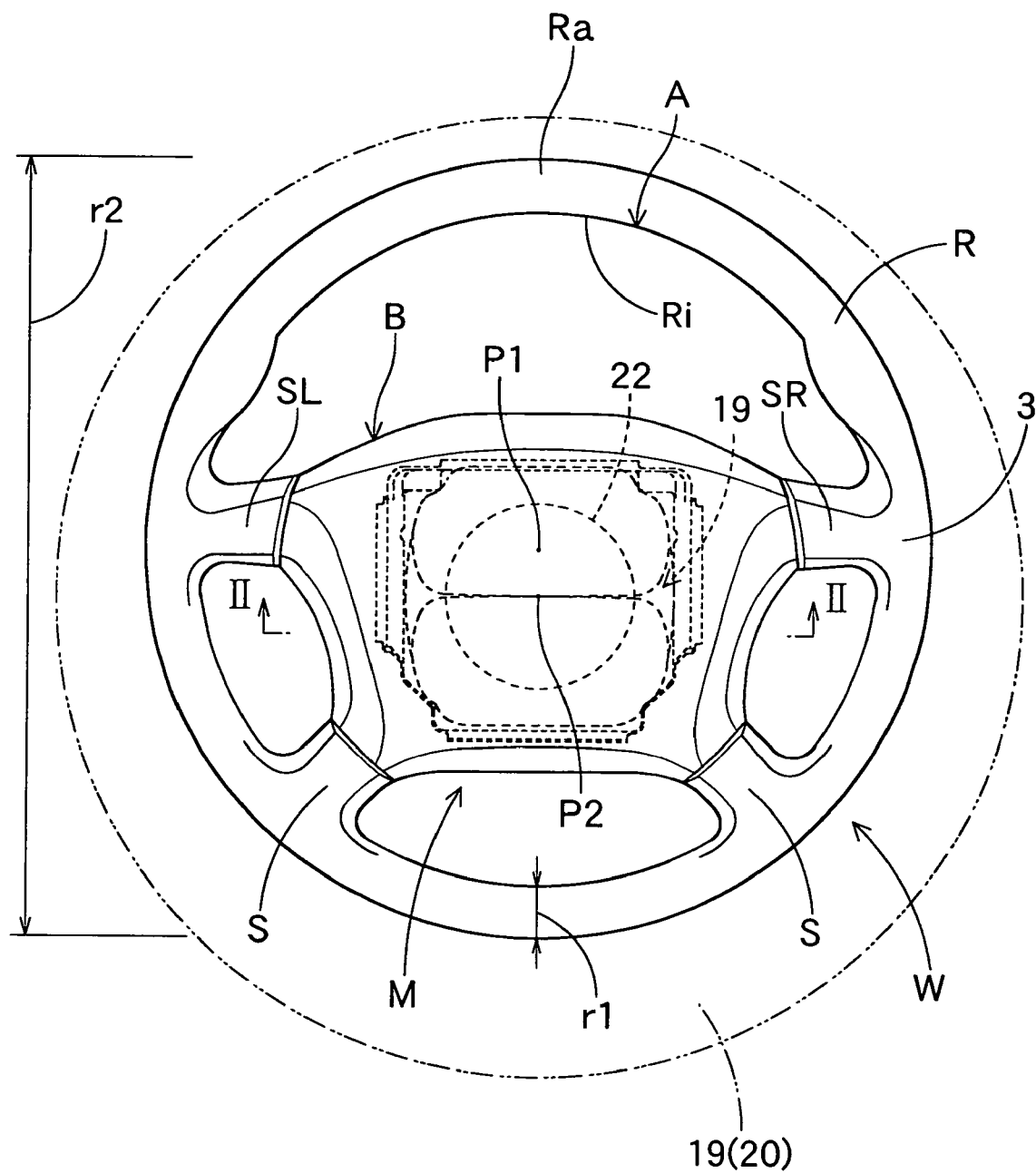
FIG. 1 is a plan view of a steering wheel in which an airbag system for a steering wheel as an embodiment according to the invention is used.
Figure 2:
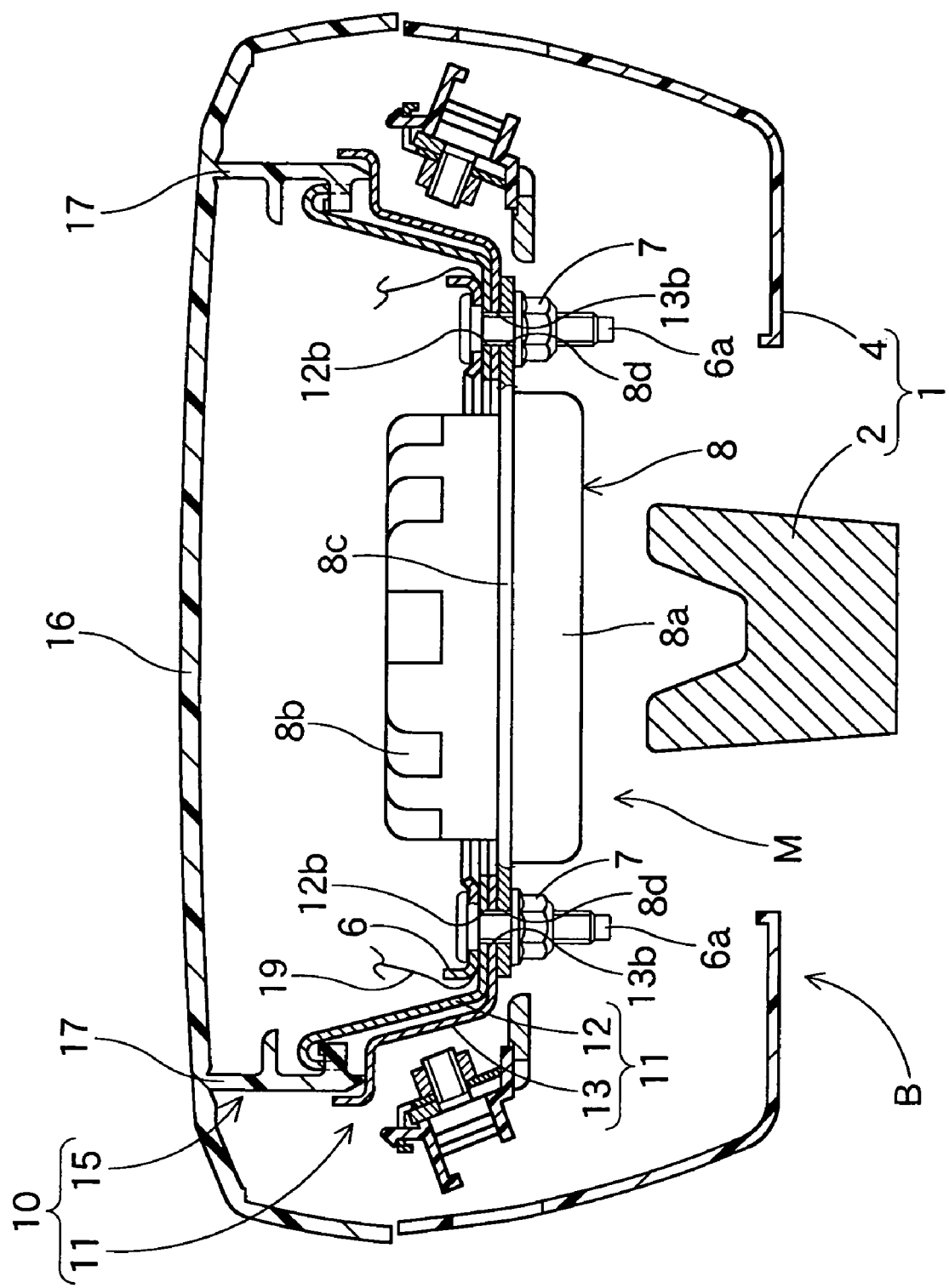
FIG. 2 is a schematic sectional view of the steering wheel of the embodiment and corresponds to a II-II section of FIG. 1.

As shown in FIG. 1 and FIG. 2, an airbag system M for the steering wheel according to the embodiment is arranged on the upper part of a boss part B at a center of the steering wheel W. The steering wheel W is provided with a ring part R formed in an approximate circle shape that is grasped upon operation, the boss B arranged at the center of the steering wheel W to be coupled to the steering shaft SS (refer to FIG. 11), and spoke parts S (four spoke parts S are arranged in the embodiment) arranged so as to couple the ring part R and the boss part B. The spoke parts S are arranged so as to be able to secure a space A for viewing a meter formed at the lower side of the ring part R upon mounting of the airbag system on the vehicle. Then, as shown in FIG. 1, the space A for viewing the meter is a region encircled by two spoke parts SL and SR elongated from the boss part B right and left, the boss part B, and the ring part R, and the space A is formed to open in an approximate half circle. Further, the space A for viewing the meter has the largest opening area in the plural spaces (in the embodiment, there are four spaces) encircled by the boss part B, the spoke part S, and the ring part R, respectively (refer to FIG. 1). In addition, in the case of the embodiment, in the ring part R, its outer diameter size r1 at the section of the grasped region is set at about 20 to 21 mm. An outer diameter size r2 of the entire ring part R is set at about 370 mm (refer to FIG. 1). In addition, the steering wheel W is composed by the airbag system M and the steering wheel main body 1 in view of the constructional elements.

The steering wheel main body 1 is provided with a core metal 2 made of an aluminum base alloy or the like, a cover layer 3 made of a synthetic resin, and a lower cover 4 made of the synthetic resin to be arranged on the lower part of the boss part B. The core metal 2 is provided so as to couple each of the ring part R, the boss part B, and the spoke parts S. The cover layer 3 covers the core metal 2 arranged on the ring part R and the core metal 2 of a portion of each spoke part S at the side of the ring part R.

As shown in FIG. 2, the airbag system M is provided with a folded airbag 19, an inflator 8 for supplying the expansion gas to the airbag 19, and a case 10, respectively. The case 10 is a member covering the folded airbag 19 and holding the airbag 19 and the inflator 8.

The inflator 8 is provided with a main body 8a formed in an approximate circular cylinder, and a flange part 8c formed in an approximate square arranged so as to project from the outer circumferential surface of the main body 8a. On the upper end side of the main body 8a, gas discharging ports 8b to discharge the expansion gas are located. On the flange part 8c, insertion holes 8d are formed, through which bolts 6a projecting from a retainer 6 (to be described later).

The retainer 6 is made of an approximate square annular steel plate and provided with four bolts 6a projecting downward at the four corners of the retainer. This retainer 6 holds a peripheral edge of a gas inlet 22 (to be described later) of the airbag 19 so as to attach the airbag 19 to a bag holder 11 of the case 10. The bolts 6a of the retainer 6 project from the flange part 8c of the inflator 8 through the peripheral edge of the gas inlet 22 and the bag holder 11 to be described later and then, the bolts 6a are fastened by nuts 7.

The case 10 includes the bag holder 11 made of a sheet metal and a pad 15 made of a synthetic resin as an airbag cover.

The bag holder 11 includes a holder plate 12 formed in an approximate rectangular parallel piped shape with its upper side opened and a back-up plate 13. The back-up plate 13 is a member to clip the pad 15 together with the holder plate 12. On respective plates 12 and 13, insertion holes 12a and 13a, through which the main body 8a of the inflator 8 is inserted from its lower side, are provided, respectively. Around the insertion holes 12a and 13a on respective plates 12 and 13, mounting holes 12b and 13b are formed, through which each bolt 6a of the retainer 6 is inserted. In addition, the back-up plate 13 is provided with a bracket (not illustrated) that is connected to the core metal 2 of the steering wheel main body 1.

The pad 15 is provided with a cover part 16 and a side wall part 17. The cover part 16 is a member to cover the upper side of the boss part B. The side wall part 17 projects downward from the lower surface side of the peripheral edge of the cover part 16 in an approximate square tubular shaped. On the region encircled by the side wall part 17 of the cover part 16, two doors (reference numeral omitted) to open, upon the expansion of the airbag 19, are provided to open toward the longitudinal directional side of the steering wheel W. Around the doors, a thin rupture planned part (reference numeral omitted) to be ruptured and smoothly open the doors by being pressed by the airbag 19 is formed. The side wall part 17 is held at its lower portion by the bag holder 11, sandwiched between the holder plate 12 and the back-up plate 13.

In the meantime, according to the embodiment, the lower surface side of the folded airbag 19 is restrained by the holder plate 12 of the bag holder 11 and the main body 8a of the inflator 8. The upper face side of the folded airbag 19 is restrained by the cover part 16 and the side wall part 17 of the pad 15.

Figure 3:
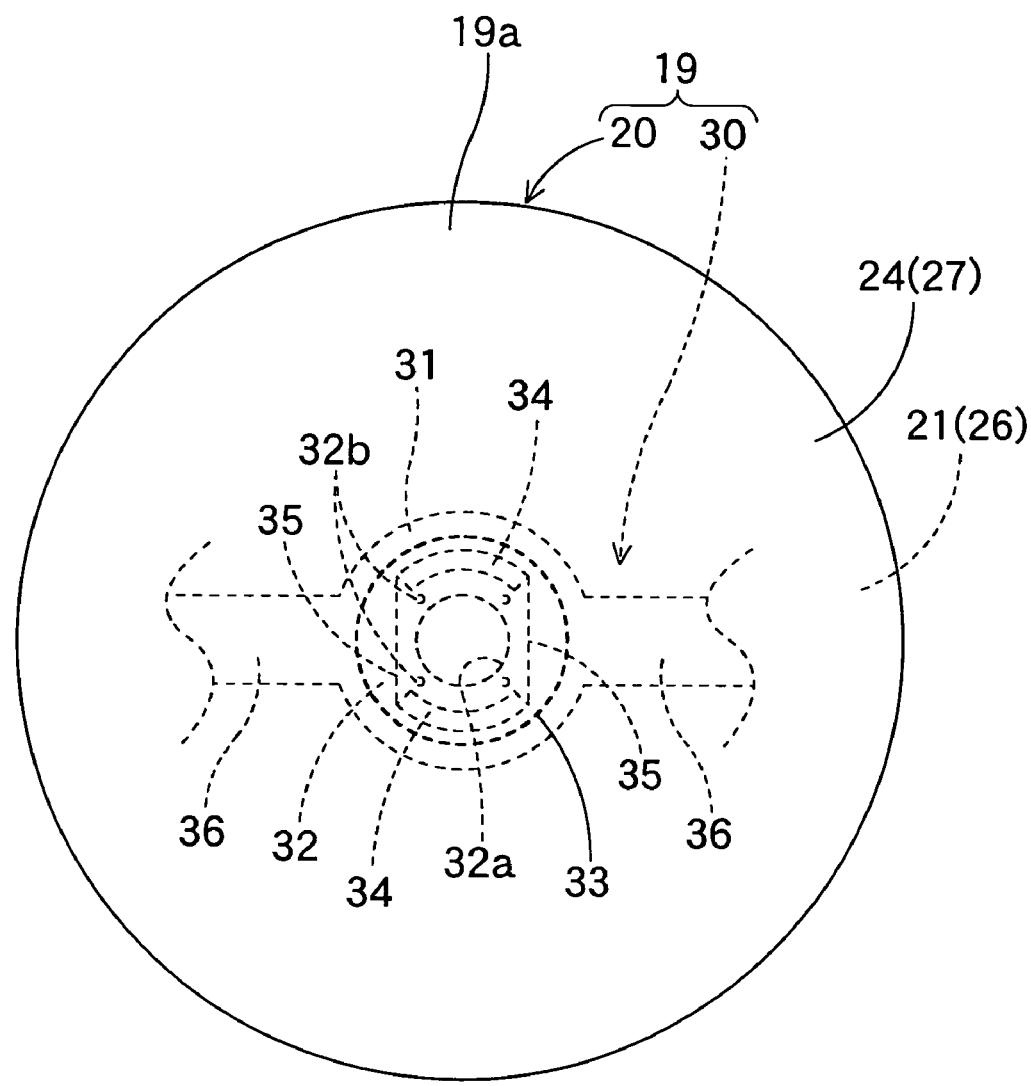
FIG. 3 is a plan view showing that the airbag used in the embodiment is unfolded.
Figure 4:
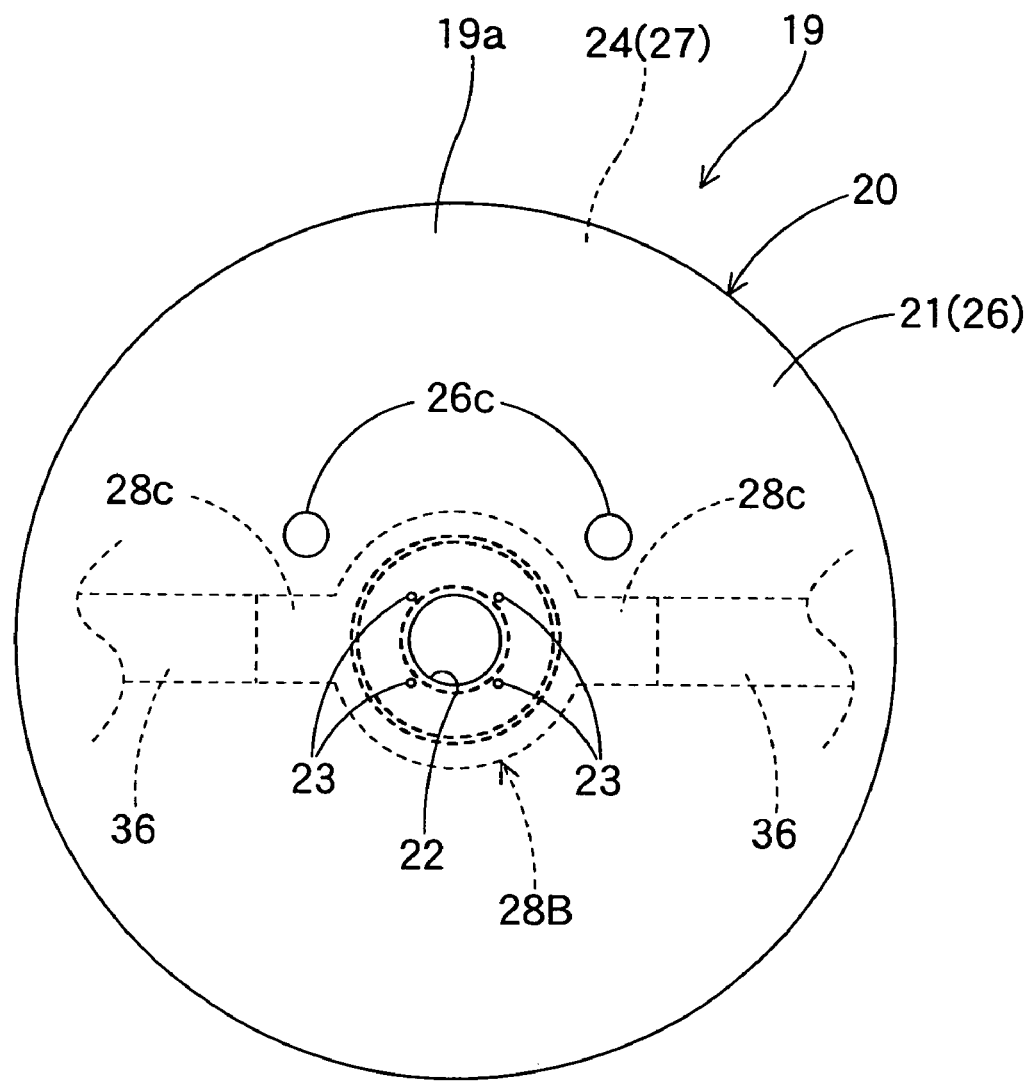
FIG. 4 is a bottom view showing that the airbag of the embodiment is unfolded.
Figure 5:
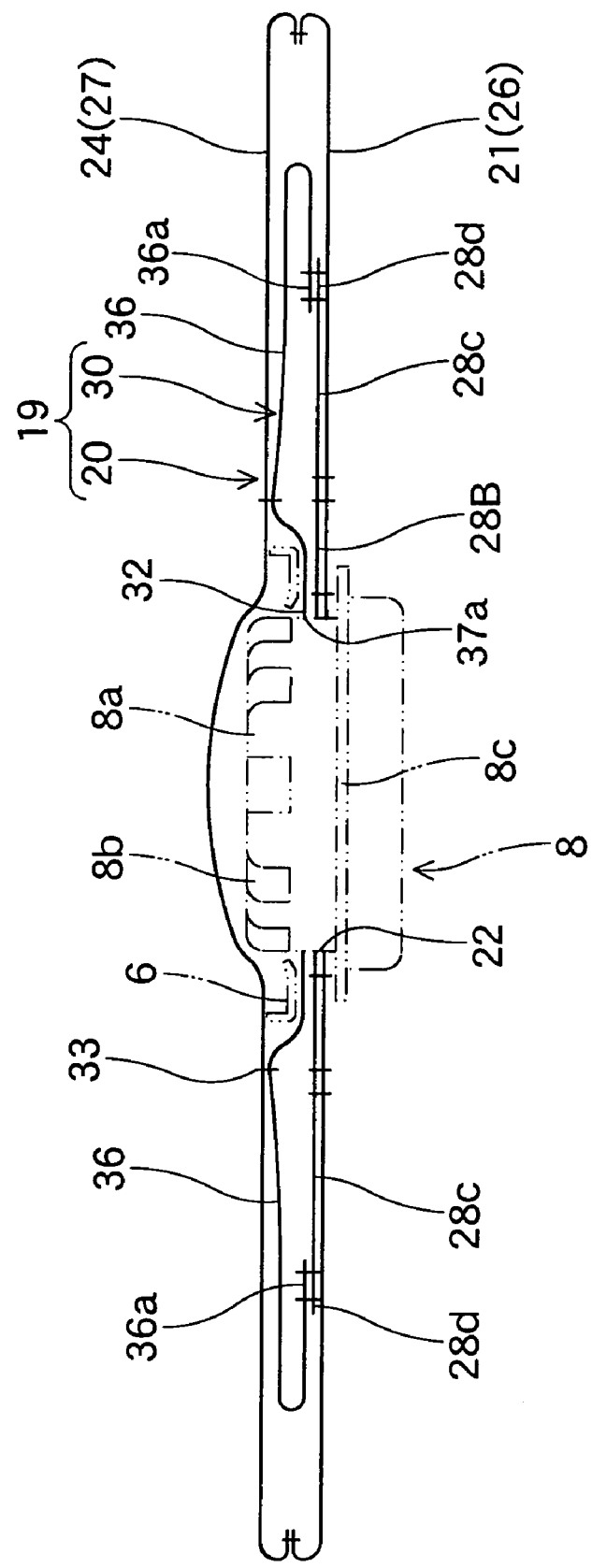
FIG. 5 is a schematic sectional view showing that the airbag of the embodiment is unfolded.

As shown in FIGS. 3 to 5, the airbag 19 is provided with a bag main body 20 formed in a bag, which expands by allowing the expansion gas to flow therein, and a flow regulating cloth 30. The flow regulating cloth 30 is a member to control the flowing direction of the expansion gas into the bag main body 20. The bag main body 20 is made of flexible woven fabric of polyamide, polyester or the like. The bag main body 20 is provided with a vehicle body side wall 21, arranged on the steering wheel W side upon completion of expansion, and a driver side wall 24, arranged on the driver MD's side upon completion of expansion. At the center of the vehicle body side wall 21, the gas inlet 22 is formed as a circular opening. The gas inlet 22 is a member, which allows the inflator main body 8*a* to be inserted from the lower side of the airbag and makes the expansion gas discharged from the gas discharging ports 8*b* of the inflator 8 to flow therein. In addition, on the peripheral edge of the gas inlet 22, four mounting holes 23 are formed, which make each bolt 6*a* formed on the retainer 6 to be inserted there through. In the meantime, in FIGS. 5, 9, and 10, the illustration of the bag holder 11 to be arranged between the peripheral edge of the gas inlet 22 of the airbag 19 and the flange part 8*c* of the inflator 8 is omitted. In addition, in the case of the embodiment, as shown in FIG. 1, the airbag 19 is mounted on the steering wheel W at a center P2 (namely, the center of the gas inlet 22) deviated to the rearward from a center P1 of the ring part R. In addition, according to the embodiment, in the bag main body 20, an outer diameter size r3 with the driver side wall 24 superimposed on the vehicle body side wall 21 is set at 650 mm (refer to FIG. 7).

Figure 6:
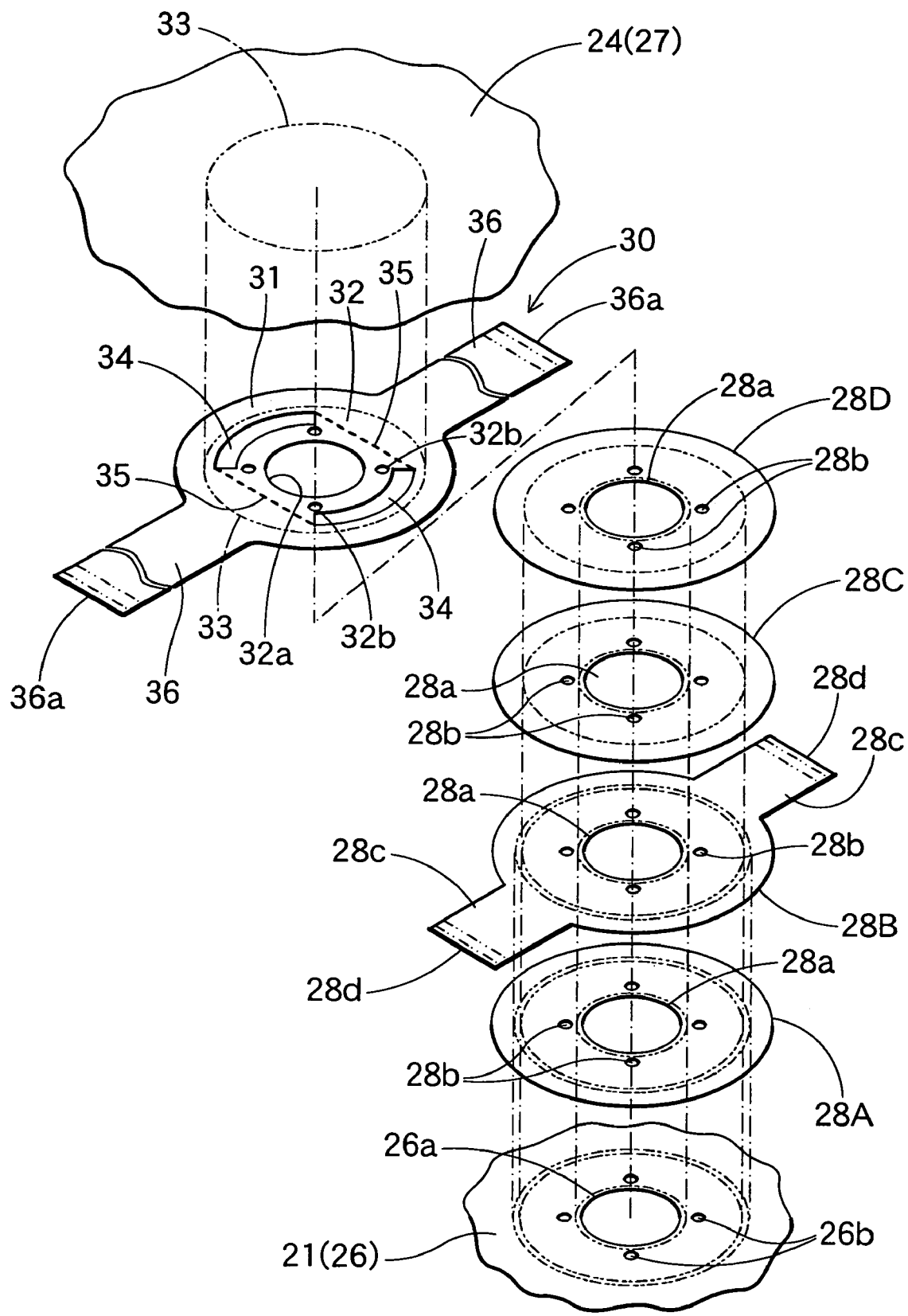
FIG. 6 is a schematic exploded perspective view showing constructional elements upon manufacture of the airbag of the embodiment.

Further, according to the embodiment, as shown in FIG. 6, the bag main body 20 is configured by an approximate circular vehicle body side base cloth 26, a circular driver side base cloth 27, and reinforced cloths 28A, 28B, 28C, and 28D. The vehicle body side base cloth 26 configures the vehicle body side wall 21, and is provided with a circular opening 26*a* configuring the gas inlet 22 at its center. The vehicle body side base cloth 26 is provided with four mounting holes 26*b* configuring the mounting holes 23 at the peripheral edge of the opening 26*a*. In addition, as shown in FIG. 4, on the vehicle body side base cloth 26, two vent holes 26*c* are formed. In the meantime, in the airbag 19 according to the embodiment, the vent holes 26*c* are arranged at a position at the rear side from the preliminarily-folded portion 40 (to be described later) when the airbag 19 is folded. The circular driver side base cloth 27 configures the driver side wall 24 and its outer shape is identical with that of the vehicle body side base cloth 26. The reinforced cloths 28A, 28B, 28C, and 28D are sewn to the peripheral edge of the opening 26*a* on the vehicle body side base cloth 26.

The reinforced cloths 28A, 28B, 28C, and 28D are provided so as to reinforce the strength of the peripheral edge of the gas inlet 22. The number of these reinforced cloths 28A, 28B, 28C, and 28D can be appropriately varied in accordance with the output of the inflator 8. On respective reinforced cloths 28A, 28B, 28C, and 28D, an opening 28*a* corresponding to the gas inlet 22 and mounting holes 28*b* corresponding to the mounting holes 23 are formed. In addition, on the reinforced cloth 28B, belt-like coupling parts 28*c* are formed so as to be elongated from the peripheral edge to the opposite transverse directional sides so as to be symmetric. These coupling parts 28*c*, 28*c* are the members to be coupled to tether parts 36, 36 (to be described later) of the flow regulating cloth 30.

The flow regulating cloth 30 is configured by a woven fabric having flexibility and made of a polyamide thread or a polyester thread or the like, as the bag main body 20. As shown in FIGS. 3, 5, and 6, the flow regulating cloth 30 is provided with an approximate circular flow regulating cloth main body 31 and two belt-like tether parts 36, 36 elongated from the peripheral edge of the flow regulating cloth main body 31. The flow regulating cloth main body 31 is coupled to the driver side wall 24 and the vehicle body side wall 21 at the vicinity of the gas inlet 22, respectively. In other words, this results in that the flow regulating cloth main body 31 couples the driver side wall 24 and the vehicle body side wall 21 at the vicinity of the gas inlet 22. Then, the flow regulating cloth main body 31 is configured so as to release the coupling state between the driver side wall 24 and the vehicle body side wall 21 at the vicinity of the gas inlet 22 when the inner pressure of the bag main body 20 reaches a certain pressure.

Specifically, the flow regulating cloth main body 31 is sewed on the vicinity of the center of the driver side wall 24 at an annular driver side coupling part 33 (a sewed region). This driver side coupling part 33 is arranged in the vicinity of the outer peripheral edge portion of the flow regulating cloth main body 31. Then, a vehicle body side coupling part 32 is arranged at the inside region of the driver side coupling part 33 in the flow regulating cloth main body 31. This vehicle body side coupling part 32 is coupled to the vicinity of the gas inlet 22 of the vehicle body side wall 21 using the retainer 6. In addition, on the vehicle body side coupling part 32, a circular opening 32*a* is formed, into which the inflator main body 8*a* can be inserted in a position corresponding to the gas inlet 22. Further, on the vehicle body side coupling part 32, four mounting holes 32*b* are formed, into which can be inserted the bolts 6*a* of the retainer 6 in accordance with the mounting holes 23. In other words, according to the embodiment, arranging the retainer 6 on the upper side of the vehicle body side coupling part 32, the vehicle body side coupling part 32 is fixed to the bag holder 11 together with the vehicle body side wall 21 by the retainer 6. Then, the flow regulating cloth main body 31, of which peripheral edge portion is coupled to the vicinity of the center of the driver side wall 24, is coupled to the vehicle body side wall 21 at the vicinity of the gas inlet 22.

In addition, gas outlets 34 are formed between the driver side coupling part 33 and the vehicle body side coupling part 32 in the flow regulating cloth main body 31. These gas outlets 34 are regions to allow the expansion gas G discharged from the inflator 8 to flow the inside of the bag main body 20. Then, these gas outlets 34 may control the flowing direction of the expansion gas G into the bag main body 20 to the longitudinal direction that are symmetric centering on this gas inlet 22. Specifically, the gas outlets 34 are provided at two places front and rear of the opening 32*a* along the peripheral edge portion of the opening 32*a*, respectively. The linear rupture planned parts 35, 35 are arranged so as to connect the gas outlets 34, 34. Each rupture planned part 35 is configured with perforated cuts formed on the base cloth composing the flow regulating main body 31. These rupture planned parts 35, 35 are ruptured when the inner pressure of the bag main body 20 reaches a certain pressure (10 to 20 kPa). Then, upon rupture of the rupture planned part 35, the driver side coupling part 33 and the vehicle body side coupling part 32 in the flow regulating cloth main body 31 are separated. As a result, the coupling condition between the driver side wall 24 and the adjacent region of the gas inlet 22 of the vehicle body side wall 21 is released.

The tether parts 36, 36 are formed in a band-like shape and they are elongated from the peripheral edge portion of the flow regulating cloth main body 31 so as to project to the right and left opposite sides. These tether parts 36, 36 control the interval from the gas inlet 22 to the driver side wall 24 upon completion of the expansion of the airbag 19 so as to control the expanding shape of the bag main body 20. The tether parts 36, 36 are coupled to the vicinity of the gas inlet 22 by sewing end portions 36*a*, 36*a* to end portions 28*d*, 28*d* of coupling portions 28*c*, 28*c* to be arranged on the reinforced cloth 28B, respectively.

Then, it is possible to manufacture the airbag 19 according to the embodiment as follows. At first, the flow regulating cloth 30 is sewed in advance on the region of the coupling part 33 in the driver side base cloth 27. In addition, on the peripheral edge portion of the gas inlet 22 of the vehicle body side base cloth 26, the reinforced cloths 28A, 28B, 28C, and 28D are sewed. Then, superposing the driver side base cloth 27 and the vehicle body side base cloth 26, respectively, so that their outer surface sides are opposed each other, and sewing their outer peripheral edges each other by using a suture thread, it is possible to form the bag main body 20. After that, the bag main body 20 is inverted by using the gas inlet 22 so that the seam allowances do no appear on the outer surface side of the airbag 19. After the inversion operation, the end portions 28d of the coupling portions 28c to be formed on the reinforced cloth 28D and the end portions 36a of the tether parts 36 to be formed on the flow regulating cloth 30 are pulled out from the gas inlet 22. Sewing the pulled end portions 28d and 36a each other, it is possible to manufacture the airbag 19.

Then, by using the airbag 19 that is manufactured as described above, the airbag system M is assembled. At first, arranging the retainer 6 between the driver side wall 24 and the flow regulating cloth main body 31 in the airbag 19, each bolt 6a is allowed to project from the mounting hole 23. After that, the airbag 19 is folded.

Figure 7A:
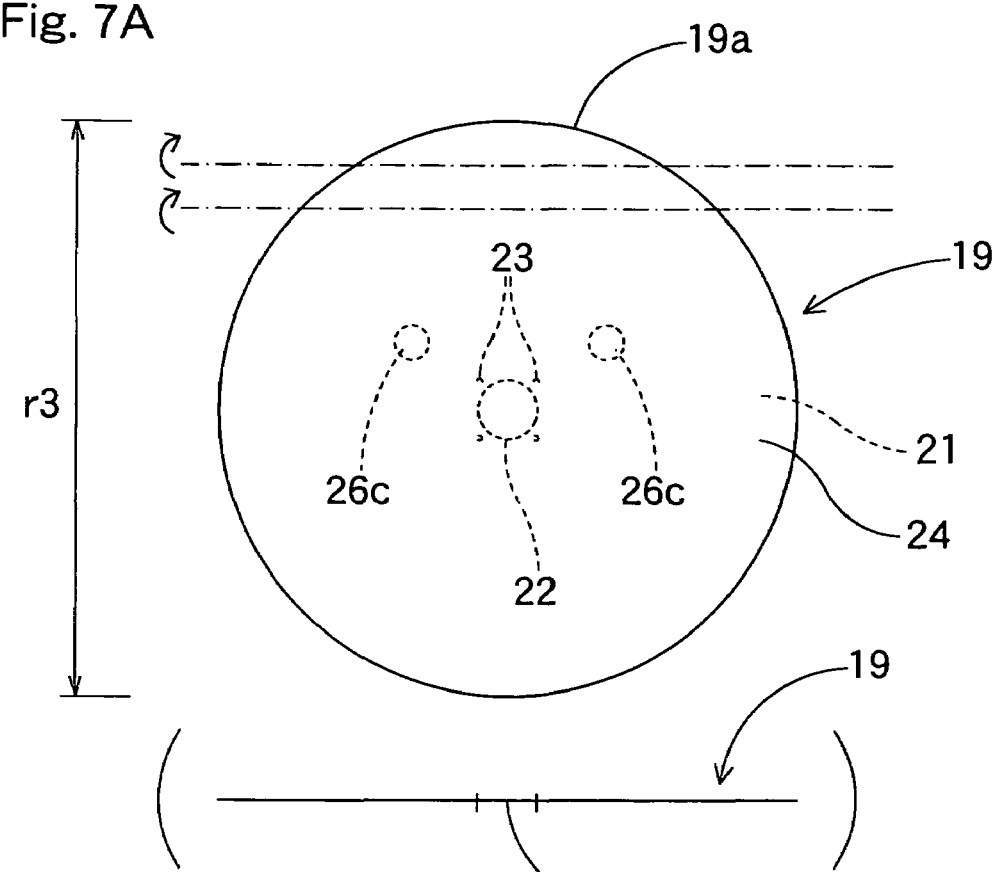
FIGS. 7A and 7B are schematic diagrams showing folding steps of the airbag of the embodiment.
Figure 7B:
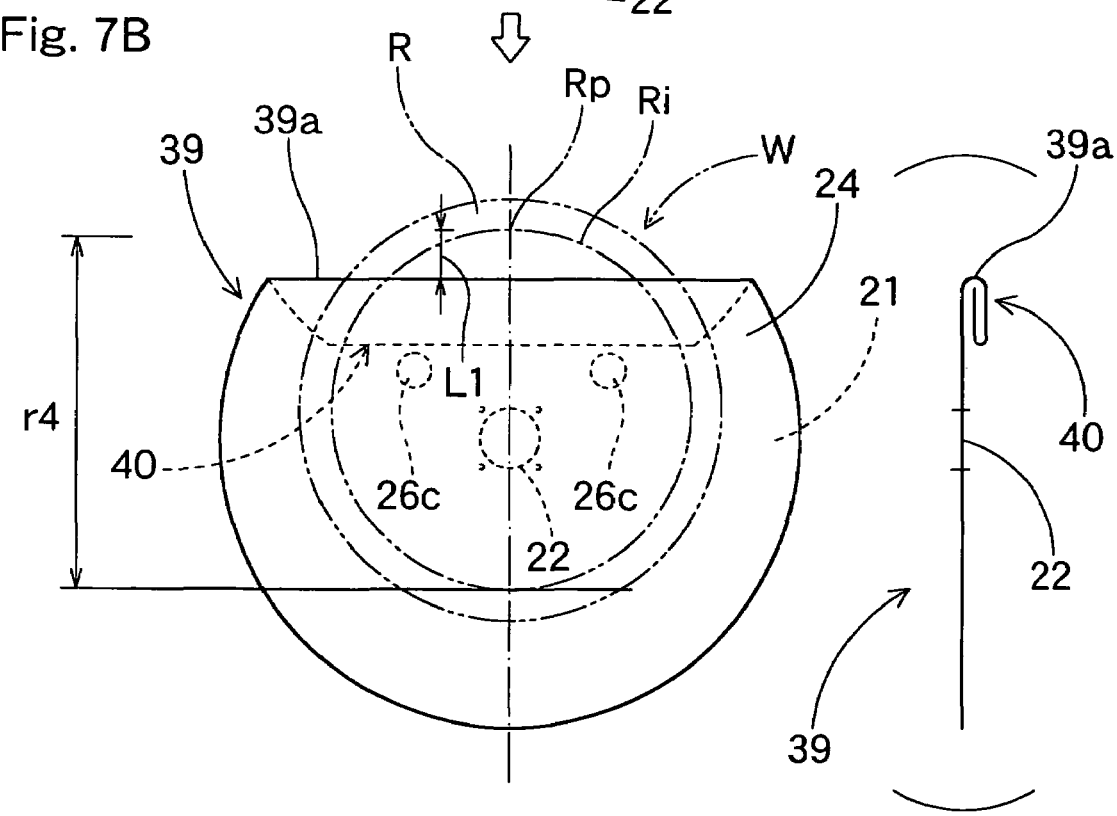

At first, the airbag 19 is preliminarily folded. Specifically, after unfolding the airbag 19 flatly with the driver side wall 24 superposed on the vehicle body side wall 21, a preliminarily-folded portion 40 is formed by the roll-folding from a front edge 19a toward the vehicle body side wall 21 along the folded lines in the transverse direction. Then, as shown in FIGS. 7A and 7B, the preliminarily-folded airbag 39 is folded so as to arrange its front edge 39a in the vicinity of an inner peripheral edge Ri at the front side of the ring part R of the steering wheel W in a plan view with the peripheral edge of the gas inlet 22 attached at the side of the steering wheel W. In addition, the preliminarily-folded portion 40 is formed on the front side of the vent holes 26c. In other words, the vent holes 26c are not filled with the preliminarily-folded portion 40 (refer to FIG. 7B). Specifically, the airbag 19 is preliminarily folded as shown in FIG. 7B in such a manner that its front edge 39a is located within a range of 20% the inner diameter size r4 of the ring part R (in the embodiment, r4 is set at 318 to 330 mm) in each of opposite direction in the front-rear direction (longitudinal direction) from a reference point Rp of the inner peripheral edge Ri on the front part of the ring part R. In other words, a direct distance L1 along the front-rear (longitudinal) direction between the front edge 39a and the reference point Rp is set not more than $r4 \times \frac{1}{5}$. In the case that the front edge 39a is located at the front side of the inner peripheral edge Ri (namely, the front side far from the center of the ring part R) with the direct distance L1 from the reference position Rp exceeding beyond $r4 \times \frac{1}{5}$, the following defects may occur. In other words, the front edge 39a of the preliminarily-folded airbag 39 is arranged widely apart from the inner peripheral edge Ri and it may be difficult for the preliminarily-folded portion 40 to smoothly enter the space A for viewing the meter formed between the ring part R and the boss part B. On the contrary, in the case that the front edge 39a is arranged at the rear side of the inner peripheral edge Ri (namely, the rear side close to the center of the ring part R) with the direct distance L1 from the reference position Rp exceeding beyond $r4 \times \frac{1}{5}$, the following defects may occur. In other words, since the area of the preliminarily-folded portion 40 is too large, it may be impossible to unfold the airbag 19 to the front side with rapidity. Therefore, when the driver is seated at the normal position that is not near the steering wheel, it is feared that the rapid unfolding of the airbag is limited. Further, there is a case that the preliminarily-folded portion 40 may fill the vent holes 26c. In addition, when the vent holes 26c are filled by the preliminarily-folded portion 40, the airbag 19 may expand in the early stage of the expansion with the inner pressure largely increased. However, even when the inner pressure in the early stage of the expansion is rapidly increased, if some troubles are not caused in the unfolding and the expansion of the airbag 19, it is obvious that the airbag 19 may be preliminarily folded to fill the vent holes 26c. In the case of the embodiment, the front edge 39a is arranged at the rear side of the inner peripheral edge Ri (namely, the rear side close to the center of the ring part R) with the direct distance L1 from the reference position Rp set at $r4 \times \frac{1}{6}$.

Figure 8A:
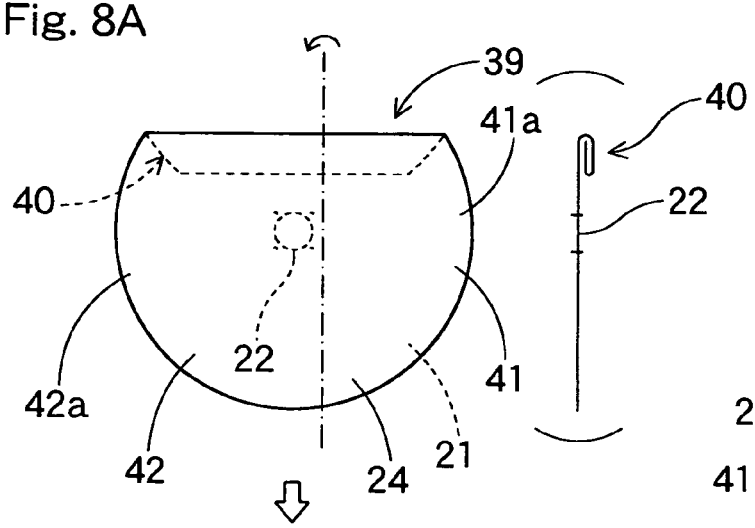
FIGS. 8A to 8F are schematic diagrams showing folding steps of the airbag of the embodiment and FIGS. 8A to 8F show steps after FIG. 7B.
Figure 8D:
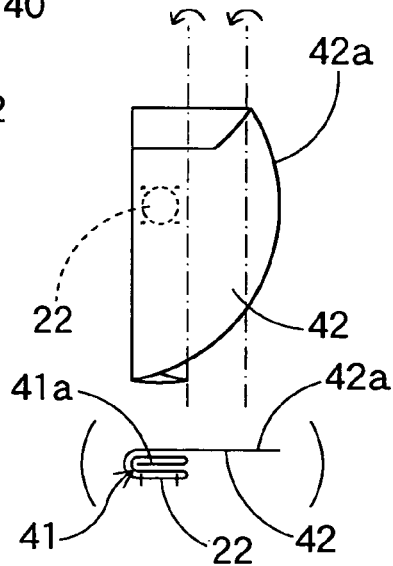
Figure 8B:
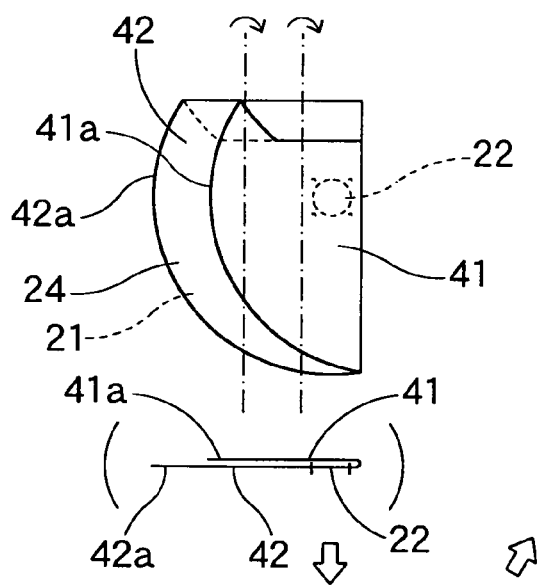
Figure 8E:
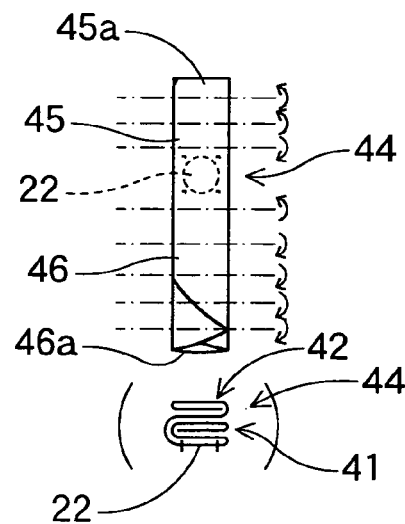
Figure 8C:
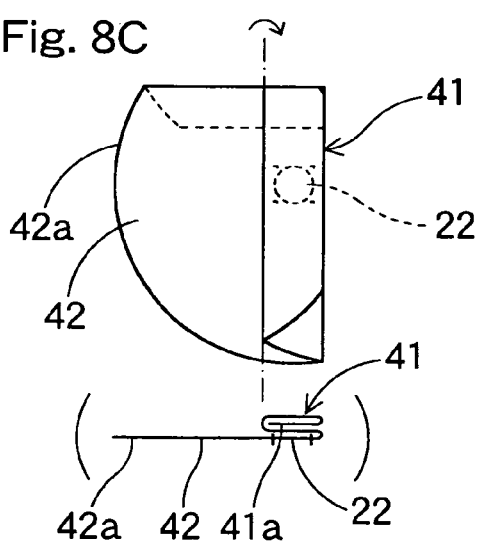

In the second place, the preliminarily-folded airbag 39 is further folded in the first and second steps. In the first step, the preliminarily-folded airbag 39 is folded so as to reduce the width in the transverse direction. Specifically, as shown in FIGS. 8A to 8E, the preliminarily-folded airbag 39 is folded along the folded lines in the approximate longitudinal direction so as to bring the regions at the right and left opposite edges close to the side of the gas inlet 22, respectively. At first, as shown in FIGS. 8A to 8C, a right side region 41 located to the right side of the gas inlet 22 is roll-folded externally along the folded lines in the longitudinal direction from the outer peripheral edge portion 41a toward the vehicle body side wall 21 so that the right side region 41 is superimposed on the upper part of the gas inlet 22. Subsequently, in the same way, as shown in FIGS. 8C to 8E, the left side region 42 located to the left side of the gas inlet 22 is roll-folded externally along the folded lines in the longitudinal direction from the edge portion 42a toward the vehicle body side wall 21 so that the left side region 42 is superimposed on the upper part of the folded right side region 41. Thus, the first step has been completed.

Figure 8F:
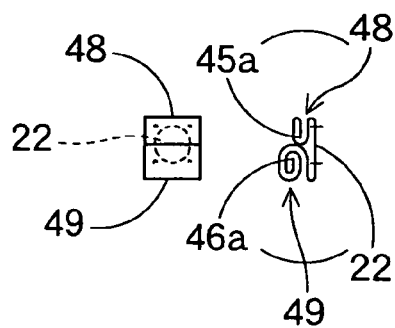

After that, in the second step, the first folded body 44 in the first step is folded so as to reduce the width in the longitudinal direction. Specifically, the first folded body 44 is folded along the folded line in the approximate transverse direction so as to bring the regions at the rear and front opposite edges close to the side of the gas inlet 22, respectively. As shown in FIGS. 8E and 8F, a folded portion 48 is formed in such a manner that a front side region 45 located to the front side of the gas inlet 22 in the first folded body 44 is roll-folded externally along the folded lines in the transverse direction from the edge portion 45a toward the vehicle body side wall 21. In the same way, a folded portion 49 is formed in such a manner that a rear side region 46 located to the rear side of the gas inlet 22 roll-folded externally along the folded lines in the transverse direction from the edge portion 46a toward the vehicle body side wall 21. Then, if these two folded portions 48 and 49 are arranged in parallel longitudinally to be superimposed above the gas inlet 22, the second step can be completed. As a result, it is possible to complete folding of the airbag 19.

Subsequently, housing of the folded airbag 19 into the case 10 will be described below. At first, the airbag 19 is put on the holder plate 12. In this case, each bolt 6a of the retainer 6 projecting from the folded airbag 19 is passed through each mounting hole 12b to be formed on the holder plate 12 of the bag holder 11.

After that, placing the pad 15 on the airbag 19 from above, the pad 15 is fastened on the holder plate 12. Further, the back-up plate 13 is arranged below the holder plate 12. Then, the side wall part 17 of the pad 15 is clipped between the holder plate 12 and the back-up plate 13 so as to hold the pad 15 by the bag holder 11. In this case, each bolt 6a of the retainer 6 is allowed to pass through the mounting hole 13b that is formed on the back-up plate 13.

Then, the main body 8a of the inflator 8 is inserted into the insertion holes 12a and 13a of the bag holder 11, the gas inlet 22, and the opening 32a from its lower side. In this case, each bolt 6a of the retainer 6 is projected from the insertion hole 8d formed on the flange part 8c of the inflator 8 downward. After that, if the nut 7 is screwed to each bolt 6a, it is possible to integrally assemble the airbag 19, the bag holder 11, and the inflator 8. As a result, the assemble of the airbag system M is completed.

After that, with the core metal 2 of the boss part B of the steering wheel main body 1 fastened to the steering shaft SS of the vehicle, by using a bracket (not illustrated) of the bag holder 11, the airbag system M is coupled to the core metal 2. Then, the airbag system M can be attached to the steering wheel W. If the steering wheel W is mounted on the vehicle and the expansion gas is discharged from the gas discharge ports 8b of the inflator main body 8a, the folded airbag 19 may expand largely by rupturing the pad 15 at the certain position.

Figure 9:
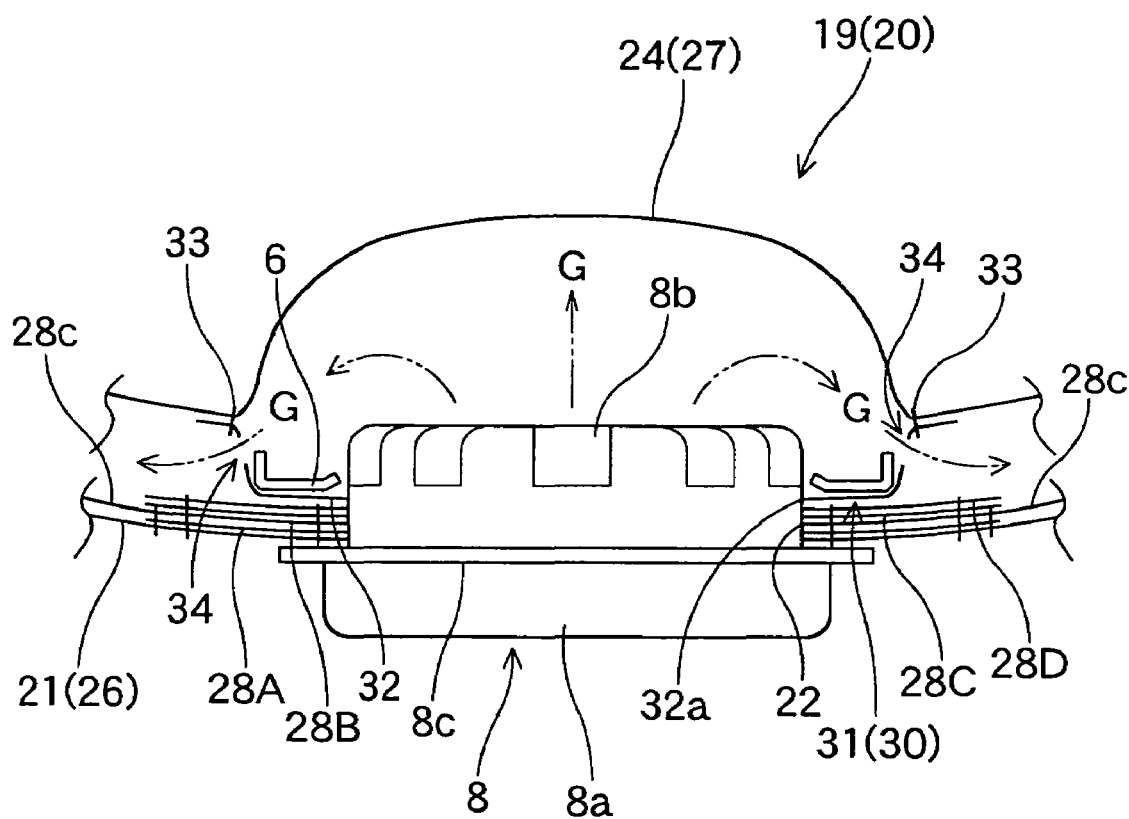
FIG. 9 is a schematic sectional view showing the early stage of expansion of the airbag in the airbag system of the embodiment.
Figure 10:
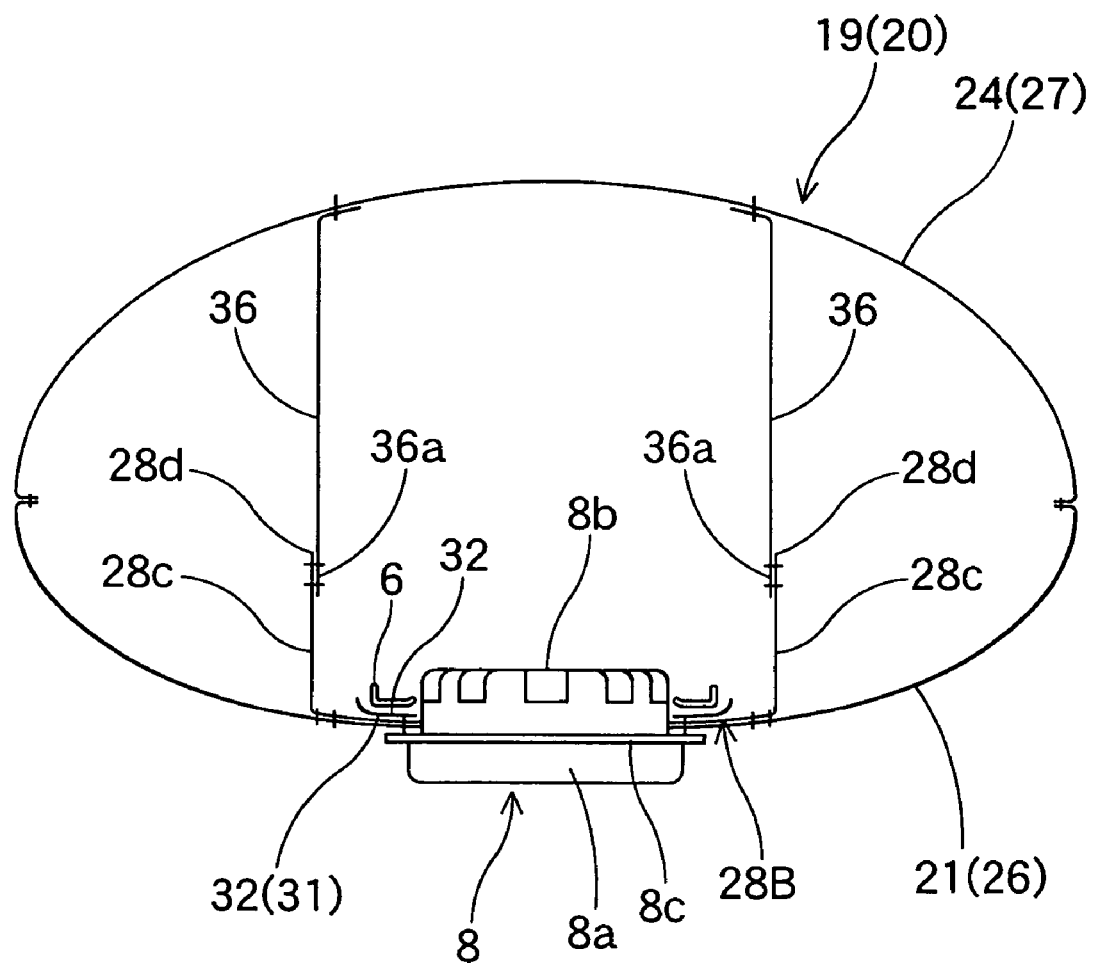
FIG. 10 is a schematic sectional view showing the completion stage of expansion of the airbag in the airbag system of the embodiment.

According to the embodiment, in the beginning of the operation of the inflator 8, the expansion gas G discharged from the gas discharge ports 8b of the inflator main body 8a, as shown in FIG. 9, is filled between the driver side wall 24 and the flow regulating cloth main body 31 once. And then, the expansion gas G may flow into the bag main body 20 with the flowing direction controlled so as to be directed from the gas outlets 34, 34 formed in the flow regulating cloth main body 31 to the longitudinal direction. After that, further, when the expansion gas G flows into the bag main body 20 and the inner pressure of the bag main body 20 reaches the certain pressure, this leads to the fact that the rupture planned parts 35 of the flow regulating cloth main body 31 are ruptured. As a result, the coupling state between the driver side wall 24 and the vehicle body side wall 21 at the vicinity of the gas inlet 22 is released. Then, the bag main body 20 has completely expanded, as shown in FIG. 10. As shown by a chain double-dashed line in FIG. 11, upon completion of the expansion, the bag main body 20 is arranged so as to cover the upper surface side of the entire steering wheel W.

Figure 12A:
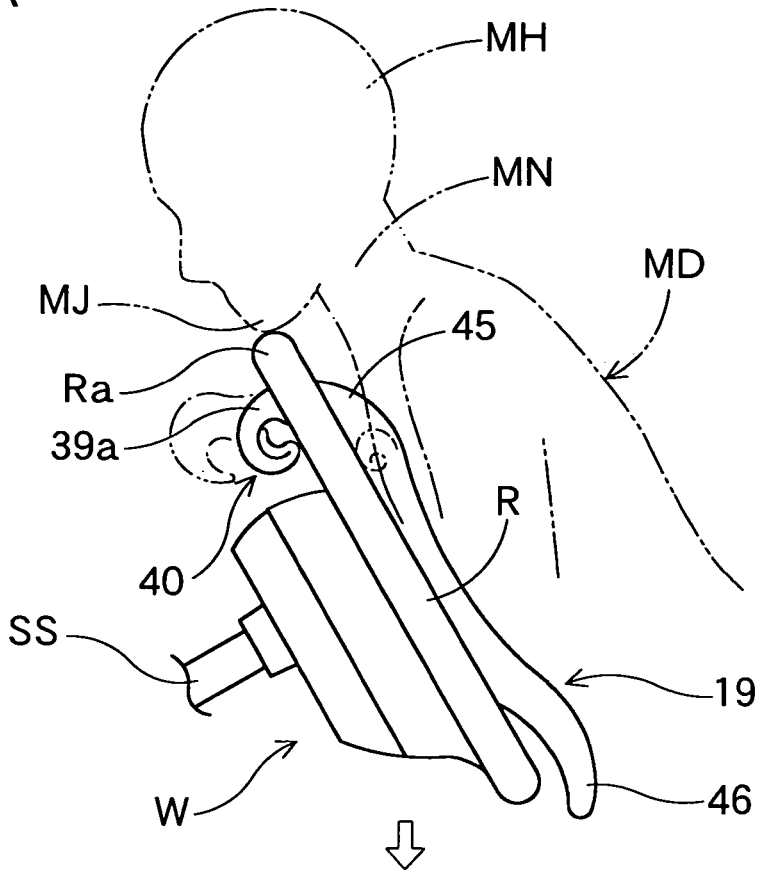
FIGS. 12A and 12B are schematic diagrams showing the expansion processes of the airbag as the driver is near a steering wheel in the airbag system of the embodiment.
Figure 12B:
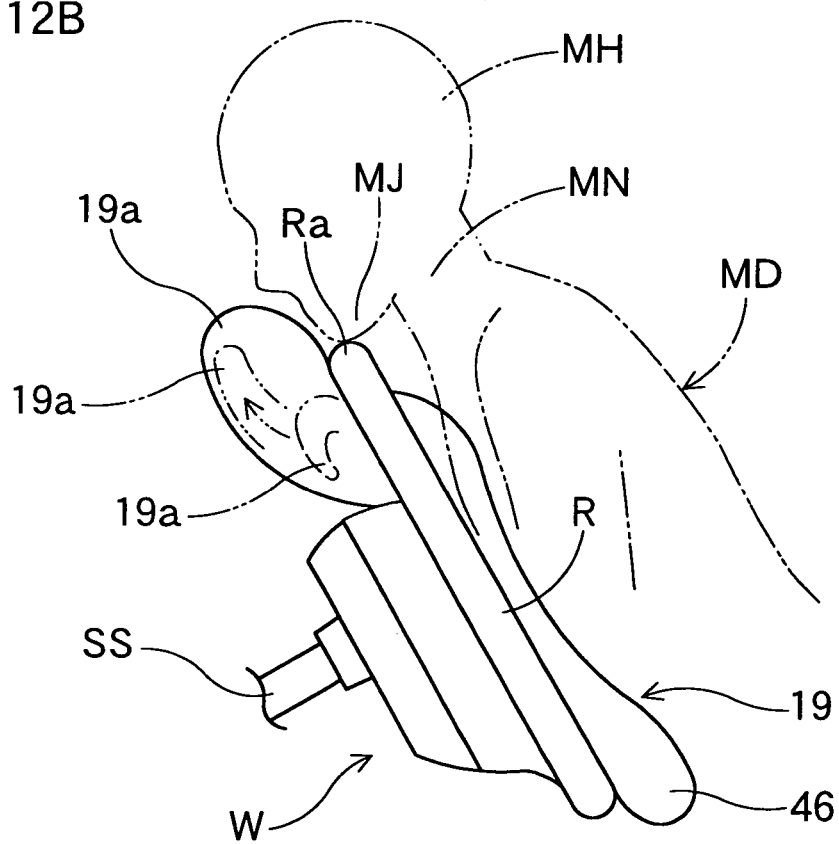
Figure 13:
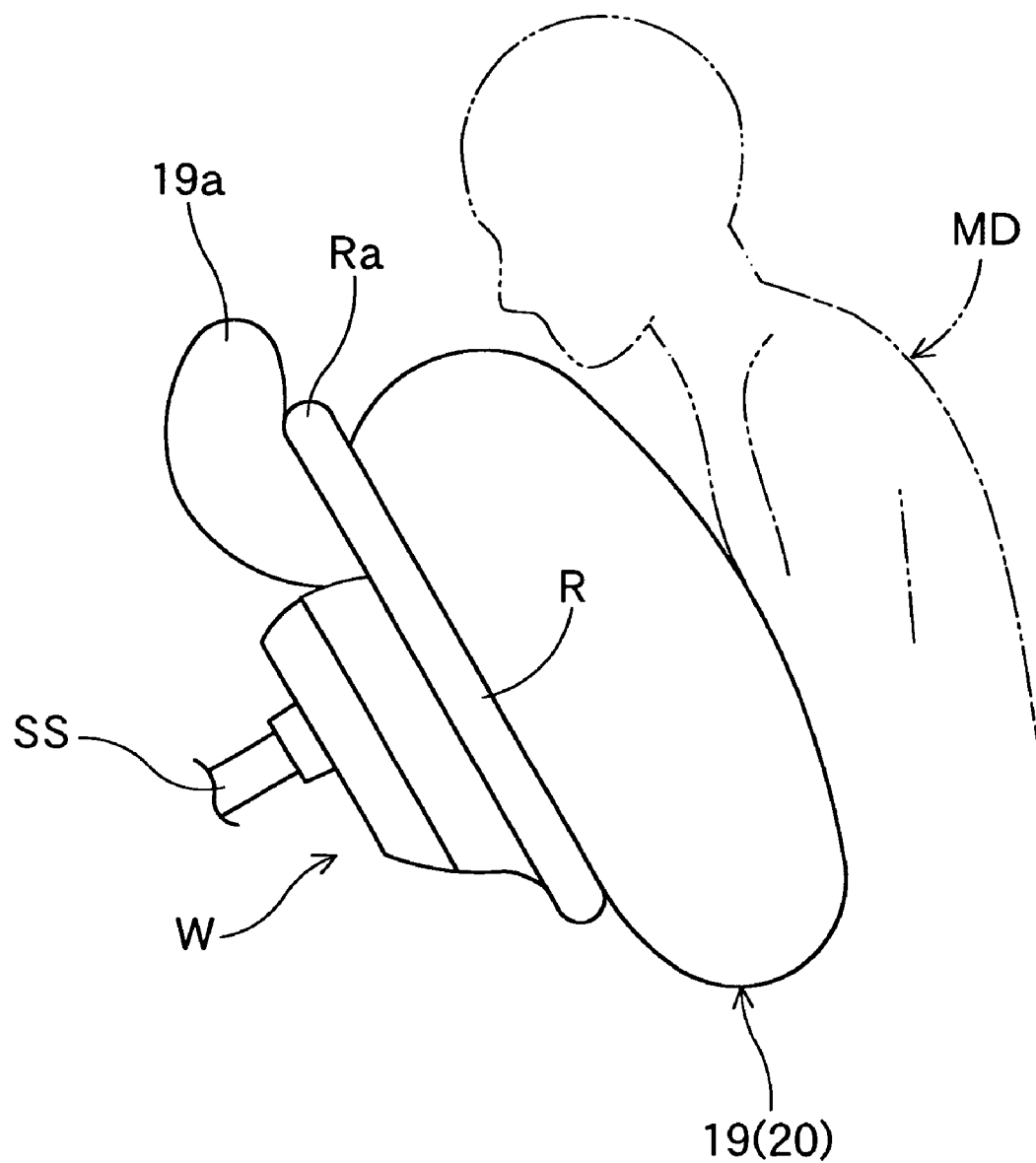
FIG. 13 is a schematic diagram showing the completion stage of expansion of the airbag as the driver is near the steering wheel in the airbag system of the embodiment.

Then, according to the airbag system M of the embodiment, in the early stage of expansion of the airbag 19, the airbag 19 is unfolded and expands while releasing the folding of the first and second steps. In this case, in the airbag system M of the embodiment, the front edge side region 19a of the airbag 19 is prevented from being unfolded to project to the driver MD's side at the early stage of expansion of the airbag 19. This is because that the airbag 19 is preliminarily folded in such a manner that the front edge 19a is folded back to the vehicle body side wall 21 before the first step. In other words, according to the airbag system M of the embodiment, in the case that the driver MD is near the steering wheel W with the head MH close to the front side Ra of the ring part R, the airbag 19 is unfolded and expand as follows. Upon unfolding and expansion of the airbag 19, the preliminarily-folded portion 40 may project to the side of the ring part R being pressed by the head MH of the driver MD. Further, as shown in FIG. 12, the preliminarily-folded portion 40 is unfolded smoothly to enter the front edge 39a into the space A for viewing the meter formed between the boss portion B and the ring part R while being pressed by the driver MD. Because the preliminarily-folded front edge 39a is arranged in the vicinity of the inner peripheral edge Ri of the ring part R. Therefore, the front edge side region 19a unfolded in this space A is pressed at its upper side by the ring part R so as to prevent this region 19a from projecting toward the head MH of the driver MD near the steering wheel W. As a result, in the airbag system M of the embodiment, even when the driver MD is near the steering wheel W, as shown in FIG. 13, the airbag 19 is completely expanded with the upper surface side of the front edge side region 19a pressed by the lower surface side of the ring part R. Then, it is possible to prevent the entire airbag 19 from strongly pressing the driver MD to the rear side with the jaw MJ fastened, at the state that the front edge side region 19a enters between the neck MN and the jaw MJ of the driver MD (refer to FIGS. 12 and 13).

Accordingly, in the airbag system M of the embodiment, even if the driver is near the steering wheel W, the airbag 19 can be unfolded and be expanded while reducing the pressing strength toward the driver MD.

In the mean time, in the case that the airbag system M is activated with the driver MD not near the steering wheel W, it is caused that the airbag 19 is unfolded and expands as follows. The front edge side region 19a of the airbag 19 enters the lower surface side of the ring part R once in the early stage of the expansion, however, the region 19a may project to the upper surface side of the ring part R in accordance with the expansion of the other regions. Because this front edge side region 19a does not interfere with the head MH of the driver MD. Therefore, as shown by the chain double-dashed line in FIG. 11, the expansion of the airbag 19 is completed so as to cover the upper surface side of the entire steering wheel W. As a result, the driver MD moving forward can be appropriately protected by the airbag 19 of which expansion is completed.

Further, the airbag system M of the embodiment is mounted on the steering wheel W having the space A for viewing the meter opened in the approximate half circle, which is the largest opening area in the plural spaces encircled by the boss part B, the spoke part S, and the ring part R, respectively. Therefore, since the space A for viewing the meter is secured widely, it is possible to put the preliminarily-folded front edge side 39a of the airbag 19 that is unfolded and expands into this space A for viewing the meter more smoothly.

In addition, according to the airbag system M of the embodiment, upon the early stage of the expansion of the airbag 19, the vicinity of the center of the driver side wall 24 and the vicinity of the gas inlet 22 are coupled by the flow regulating cloth 30. Therefore, it is possible to control the thickness in the vicinity of the center of the airbag 19 upon the early stage of the expansion of the airbag 19. In other words, according to the airbag system M of the embodiment, upon the early stage of the expansion of the airbag 19, it is possible to prevent the airbag 19 from largely projecting to the driver MD's side and the vicinity of the center from thickly expanding. Then, it is caused that the airbag 19 thickly expands when the airbag 19 widely expands in the longitudinal and transverse directions. Therefore, upon the early stage of the expansion of the airbag 19, it is possible to prevent the driver MD from being strongly pressed to the rear side. Particularly, according to the airbag system M of the embodiment, in the airbag 19, the right side region 41 located right side, the left side region 42 located left side, the front side region 45 located front side, and the rear side region 46 located rear side, are roll-folded externally in the first and second steps, to roll from their ends 41a, 42a, 45a, 46a toward the vehicle body side wall 21, respectively. Therefore, upon the early stage of the expansion of the airbag 19, it is possible to unfold the airbag 19 so as to release the folding of respective regions 41, 42, 45, and 46 with rapidity. As a result, the airbag 19 can be unfolded widely in the longitudinal and transverse directions.

Further, according to the airbag system M of the embodiment, upon the early stage of the expansion of the airbag 19, the expansion gas flows into the bag main body 20 along the longitudinal direction through the gas outlets 34 to be formed on the flow regulating cloth 30. Therefore, the airbag 19 can be unfolded along the longitudinal direction with rapidity and the preliminarily-folded portion 40 can be unfolded so as to enter with rapidity into the space A for viewing the meter.

Still further, according to the airbag system M of the embodiment, in the second step, the front side region 45 located to the front side of the gas inlet 22 in the airbag 19 is roll-folded externally from the edge portion 45a toward the vehicle body side wall 21. Therefore, upon the early stage of the expansion of the airbag 19, when the airbag 19 expands while releasing the folding in the second step, the front side region 45 roll-folded externally can easily be unfolded so as to enter the space A for viewing the meter formed between the boss part B and the ring part R while releasing the folding. As a result, it is possible to certainly put the preliminarily-folded portion 40 into the space A for viewing the meter. In addition, upon the early stage of the expansion of the airbag 19, when the folding is released in the second step, it is possible to prevent the expanding front side region 45 from projecting toward the head MH of the driver MD. Therefore, it is possible to further prevent the expanded front side region 45 from pressing the head MH of the driver MD near the steering wheel W. If such a point is not considered, it is obvious that the front side region 45 may be roll-folded internally from its edge region 45a toward the driver side wall 24. Further, the front side region 45 may be folded by accordion folding. In the meantime, according to the embodiment, in the second step, the rear side region 46 is roll-folded externally from the outer peripheral edge portion 46a toward the vehicle body side wall 21, as same as the front side region 45. However, the folding shape of the rear side region 46 is not limited to this, and for example, the rear side region 46 may be folded, by the internal rolled-folding or the accordion folding or the like.

Still further, according to the airbag system M of the embodiment, the vent holes are arranged at a position of the vehicle body side wall 21 that is not filled with the preliminarily-folded portion 40. Therefore, upon the early stage of the expansion of the airbag 19 with the driver MD near the steering wheel W, it is possible to prevent the sudden rise of the inner pressure of the airbag 19.

In addition, according to the embodiment, the airbag 19 may be preliminarily folded so that the front edge 39a of the preliminarily-folded airbag 39 is located at the rear side of the inner peripheral edge Ri of the ring part R. Therefore, with the driver MD near the steering wheel W, it is possible to certainly put the preliminarily-folded portion 40 into the space A for viewing the meter. It is obvious that the airbag 19 may be folded so that the front edge 39a is located at the front side of the inner peripheral edge Ri if the front edge 39a is arranged within the range of 20% of the inner diameter size r4 of the ring part R so as to be capable of entering the lower surface side of the ring part R, interfering with the driver MD near the steering wheel W when the airbag 19 is unfolded and expands.

What is claimed is:

1. An airbag system for a steering wheel that is mounted on a steering wheel,
    wherein the steering wheel comprises: a ring part, which is formed in an approximate annular shape and is held upon operation of the steering wheel; a boss part, which is arranged on a center of the steering wheel and is coupled to a steering shaft; and a spoke part, which is arranged so as to connect said ring part with said boss part;
    said spoke part is provided so as to be able to secure a space for viewing a meter formed at said inner circumferential side of said ring part;
    said airbag system for the steering wheel comprises an airbag that is folded and housed in said boss part, said airbag can be unfolded and expand allowing the expansion gas to flow therein so as to be able to protect a driver and cover the upper side of said steering wheel; and
    said airbag is configured in such a manner that a peripheral edge of an approximate circular vehicle body side wall, which is arranged at the side of the steering wheel upon completion of expansion and has a gas inlet for allowing the expansion gas to flow in the vicinity of the center thereof, and a peripheral edge of a driver side wall, which is arranged at the driver's side upon completion of expansion and of which an outer shape is approximately the same as that of said vehicle body side wall, are coupled to each other;
    wherein said airbag is folded and housed through at least two steps, namely, a first step and a second step after said airbag is unfolded flatly with said driver side wall and said vehicle body side wall superposed;
    in said first step, in order to reduce a width in a transverse direction of said airbag, the regions at the opposite edges in the transverse direction are folded along folded lines in the approximate longitudinal direction, respectively, so that the transverse edges are brought close to said gas inlet side; and
    in said second step, in order to reduce a width in the longitudinal direction of said airbag that is folded in said first step, the regions at the opposite edges in the longitudinal direction are folded along folded lines in the approximate transverse direction, respectively, so that the longitudinal edges are brought close to said gas inlet side;
    wherein the airbag is folded through a preliminarily-folding step that a front edge side region in said airbag flatly unfolded with said driver sidewall superposed on said vehicle body side wall is folded back to said vehicle body side wall along a folded line in the transverse direction;
    said airbag after performing the preliminarily-folding step is configured so as to arrange said folded front edge side in such a manner that the folded front edge side is arranged in the vicinity of the inner peripheral edge at the front side of said ring part of said steering wheel in a plan view with the peripheral edge of the gas inlet attached at the side of the steering wheel,
    the front edge of the preliminarily-folded airbag is located within a range of 20% of the inner diameter of the ring part in each of opposite directions in the front-rear direction from a reference point on the inner peripheral edge of the front part of the ring part.

2. The airbag system for a steering wheel according to claim 1, wherein, according to said second step, said airbag is folded in such a manner that at least a front side region located to the front side of said gas inlet is roll-folded from a front edge portion toward said vehicle body side wall.

3. The airbag system for a steering wheel according to claim 1,
    wherein at least two spoke parts are provided at said steering wheel so as to be elongated from said boss part right and left; and
    said space for viewing the meter in said steering wheel is formed opening into an approximate half circle and it has the largest opening area in plural spaces encircled by said boss part, said spoke part, and said ring part, respectively.

4. The airbag system for a steering wheel according to claim 1, wherein the folded front edge side in said airbag after the preliminarily-folding step is arranged at a rear side from an inner peripheral edge of the front part of said ring part.

5. The airbag system for a steering wheel according to claim 1, wherein said airbag comprises a bag main body and a flow regulating cloth to control a flowing direction of the expansion gas into said bag main body; and said flow regulating cloth is configured so as to be able to flow the expansion gas along the longitudinal direction upon the early stage of the expansion of the airbag.

6. The airbag system for a steering wheel according to claim 1, wherein a vent hole to discharge the excess expansion gas flowing in said airbag is formed on said vehicle body side wall, and said vent hole is arranged at a position that is not filled with a preliminarily-folded portion to be formed by said preliminarily-folding step.

* * * * *